US008446614B2

United States Patent
Hibino et al.

(10) Patent No.: US 8,446,614 B2
(45) Date of Patent: May 21, 2013

(54) DATA TRANSMITTING AND RECEIVING SYSTEM, TRANSMITTING APPARATUS AND RECEIVING APPARATUS

(75) Inventors: Takeshi Hibino, Aichi-ken (JP); Hideyuki Hashimoto, Aichi-ken (JP); Kenichi Sawada, Aichi-ken (JP); Kazuyuki Kawabata, Aichi-ken (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1093 days.

(21) Appl. No.: 11/162,853

(22) Filed: Sep. 26, 2005

(65) Prior Publication Data

US 2007/0019227 A1  Jan. 25, 2007

(30) Foreign Application Priority Data

Jul. 21, 2005 (JP) ................................. 2005-211304

(51) Int. Cl.
*G06F 3/12* (2006.01)

(52) U.S. Cl.
USPC ......... 358/1.15; 358/1.13; 358/407; 358/434; 358/435; 358/436; 358/438; 358/439; 358/440

(58) Field of Classification Search
USPC .............. 358/1.13, 1.15, 1.16, 402, 407, 434, 358/435, 436, 438, 439, 440
See application file for complete search history.

(56) References Cited

U.S. PATENT DOCUMENTS

| | | | |
|---|---|---|---|
| 5,408,333 A | 4/1995 | Kojima et al. | |
| 5,692,036 A | 11/1997 | Saito | |
| 6,459,504 B1 | 10/2002 | Murano et al. | |
| 6,710,897 B1 | 3/2004 | Shimoyama | |
| 6,784,904 B2 | 8/2004 | Dow et al. | |
| 7,161,697 B2* | 1/2007 | Yajima | 358/1.15 |
| 7,602,511 B2* | 10/2009 | Kojima et al. | 358/1.15 |
| 2005/0168774 A1* | 8/2005 | Eguchi et al. | 358/1.15 |

FOREIGN PATENT DOCUMENTS

| | | |
|---|---|---|
| JP | 5-292276 A | 11/1993 |
| JP | 06-225035 | 8/1994 |
| JP | 07-283923 | 10/1995 |
| JP | 8-335998 A | 12/1996 |
| JP | 2001-256124 | 9/2001 |
| JP | 2002-290643 | 10/2002 |

OTHER PUBLICATIONS

Official Action (Notification of Reasons of Refusal) issued by the Japanese Patent Office in priority Japanese Patent Application No. 2005-211304; Jul. 24, 2007; and English translation thereof.

* cited by examiner

*Primary Examiner* — Vu B Hang

(74) *Attorney, Agent, or Firm* — Buchanan Ingersoll & Rooney PC

(57) ABSTRACT

In a system where a transmitting apparatus is connected via a network to a receiving apparatus, the receiving apparatus has a storage device for storing destination information which can be registered to a key in an operating device to be operated for transmission in a transmitting apparatus. When data is received from the transmitting apparatus, the destination information including an icon or information on a site wherein the destination information is stored is returned to the transmitting apparatus. Thus, registration of destination information to the key becomes easy at the transmitting apparatus.

18 Claims, 18 Drawing Sheets

Fig.9

DATA TRANSMITTING AND RECEIVING SYSTEM, TRANSMITTING APPARATUS AND RECEIVING APPARATUS

This application is based on application No. 2005-211304 filed in Japan, the contents of which are hereby incorporated by reference.

BACKGROUND OF THE INVENTION

1. Field of the Invention

The present invention relates to data transmission via a network between a transmitting apparatus and a receiving apparatus.

2. Description of the Prior Art

Various types of data of documents, photographs and the like are transmitted and received among apparatuses connected to a network such as a local area network. Data are transmitted in various transmission methods. For example, image data can be sent with a facsimile transmission, or a file can be sent by being attached to an electronic mail. In order to transmit data, an operator at a transmitting apparatus selects a transmission method, designates a receiving apparatus (a destination) with a telephone number, an electronic mail address or the like and instructs to transmit the data to the receiving apparatus.

In order to help an operator to set the destination easily for data transmission, it is known to provide abbreviated dials, one-touch keys or the like in a transmitting apparatus. An operator can register destination information such as an address and transmission conditions to an abbreviated dial, a one-touch key or the like. Only by selecting and operating one of the abbreviated dials, one-touch keys and the like, data transmission can be executed with the setting registered to the selected abbreviated dial, one-touch key or the like. (Hereinafter an abbreviated dial, a one-touch key or the like is referred simply to a one-touch key.) In order to assist the registration to a one-touch key, it is known to register destination information such as an address and transmission conditions based on transmission history. For example, in a facsimile apparatus disclosed in Japanese Patent laid open Publication H06-225035/1994, a telephone number and identification information of a destination are extracted from response signals received from the destination and registered in a storage device in correspondence to the one-touch key. In another facsimile apparatus disclosed in Japanese Patent laid open Publication H07-283923/1995, when it is decided that the data transmission is terminated normally, the telephone number of the destination is registered to an abbreviated dial.

In a data transmission apparatus having a plurality of one-touch keys, when an operator intends to select one of them, he or she distinguishes the setting for transmission based on information displayed with characters on the one-touch keys. However, it may not be easy to distinguish the setting when the display area assigned to one-touch keys is limited. In such a case, an operator has to display and observe detailed information on the relevant one-touch key in order to confirm the destination. Then it is proposed to represent a destination with an icon (image) in order to recognize the destination visually. For example, in a facsimile apparatus disclosed in Japanese Patent laid open Publication 2001-256124, an icon for a one-touch key is selected and is registered in a database for storing destination information. Before data is transmitted, one-touch keys are displayed with icons for helping an operator to designate a destination. When the operator selects one of the icons, the destination registered to the one-touch key represented with the selected icon is set, and the transmission is started. In another facsimile apparatus disclosed in Japanese Patent laid open Publication 2002-290643, it is possible to edit an icon or to get an icon from an external apparatus.

As explained above, when icons which represent one-touch keys are displayed, an operator can distinguish or select a one-touch key among them easily. In this case, icons have to be created by the number of destinations to be registered at the transmitting apparatus. Then, it is needed to create the icons or to select, download and process them from the contents stored in an external apparatus, but this is troublesome for users of the apparatus. Therefore, it is desirable to help the transmission setting including an icon at a transmitting apparatus.

SUMMARY OF THE INVENTION

An object of the invention is to help registration to a key such as a one-touch key in data transmission wherein destination information is registered preliminarily to the key.

In one aspect of the present invention, a data transmission system includes a transmitting apparatus which transmits data and a receiving apparatus which receives the data. In the transmitting apparatus, a communication device transmits data via the network to the receiving apparatus, and an operation device for operating keys is provided for instructing data transmission to the communication device. Destination information of the receiving apparatus is able to be registered to one of the keys, and it includes image data to be displayed on the one of the keys. On the other hand, in the receiving apparatus, a storage device stores destination information or site information on a site which stores the destination information. A communication device returns the destination information or the site information stored to the transmitting apparatus after the data is received from the transmitting apparatus. The transmitting apparatus further includes a register device which registers the destination information to the one of the keys in the operation device when the address information is received from the receiving apparatus or from the site.

An advantage of the present invention is that because the receiving apparatus transmits destination information including image data to the transmitting apparatus, it becomes easy to register the address information to a key which helps to recognize the destination visually.

Another advantage of the present invention is that once a transmitting apparatus transmits data to a receiving apparatus, it can transmit data to the receiving apparatus only by selecting the image data shown on a key to which destination information is registered.

BRIEF DESCRIPTION OF THE DRAWINGS

These and other objects and features of the present invention will become clear from the following description taken in conjunction with the preferred embodiments thereof with reference to the accompanying drawings, and in which:

FIG. 9 is a diagram of screens for selecting a one-touch key and for displaying detailed data of the destination information;

DETAILED DESCRIPTION OF THE PREFERRED EMBODIMENTS

Figure 1:
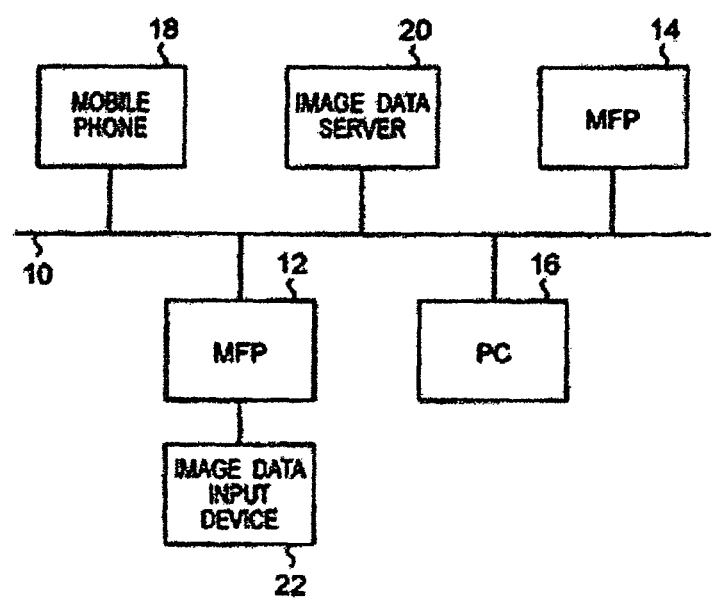
FIG. 1 is a diagram of a network system for data transmission.

Referring now to the drawings, wherein like reference characters designate like or corresponding parts throughout the several views, FIG. 1 shows various apparatuses connected to a network and transmitting data via the network. For example, multi-functional peripherals 12, 14, a personal computer (PC) 16, a mobile telephone 18, an image data server apparatus 20 and the like are connected to a network 10 such as a local area network. A multi-functional peripheral (MFP) 12, 14 has various functions such as scan, print, copy and facsimile transmission. For example, it can read image data of a document or the like with the scan function. The scanned image data is stored in a hard disk provided in the multi-functional peripheral as a storage device or is transmitted to another apparatus 14, 12, 16, 18, 20 through the network 10. The mobile phone 18 is a terminal of wireless communication which can transmit data with the other apparatuses 12-16 and 20. The image data server apparatus 20 which stores image data received from and transmitted to other apparatuses 12-18. Further, an image data input device 22 such as a digital camera, a video camera or a digital telephone creates an image data and sends it to a different apparatus. The image data is gotten in the multi-functional peripheral 12 or the like. The above-mentioned data transmission may be performed in various transmission methods such as an electronic mail, a facsimile transmission and the like. A file server for managing document files or the like may be used instead of the image data server apparatus 20.

Figure 2:
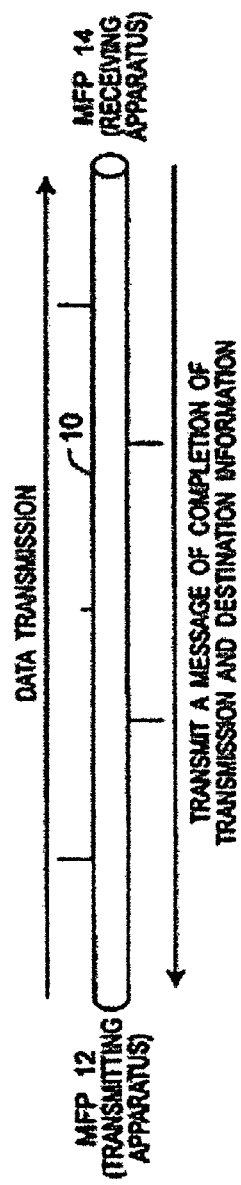
FIG. 2 is a diagram for explaining data transmission between transmitting and receiving apparatuses.

In the system shown in FIG. 1, an apparatus, for example the multi-functional peripheral 12, transmits image data via the network 10 to a different apparatus, for example the multi-functional peripheral 14 as a receiving apparatus. The multi-functional peripheral 14 receives the image data and returns a message of completion of transmission to the multi-functional peripheral 12 as the transmitting apparatus 12 (refer to FIG. 2). As will be explained later in detail, besides the message of completion of transmission, destination information of the transmitting apparatus or the multi-functional peripheral 12 is also returned. Data transmission is explained below with an electronic mail between the multi-functional peripheral 12 as a transmitting apparatus and the multi-functional peripheral 14 as a receiving apparatus. However, needless to say, data can be transmitted between apparatuses other than the above-mentioned multi-functional peripherals 12, 14, and the invention is not limited to the above-mentioned combination of the apparatuses.

Next, the setting of destination information in data transmission is explained. It is necessary to set transmission conditions including a destination such as an electronic mail address or a facsimile number which represents destination of the data transmission. In order to help this destination setting, one-touch keys are displayed in a screen of a touch panel provided in the multi-functional peripherals 12, 14. Destination information such as transmission conditions including a destination is registered to each of one-touch keys, and it is represented with an icon shown on a one-touch key in the screen. An operator specifies a data to be transmitted in the data of documents and the like stored in the hard disk and selects one of the icons or one-touch keys in the screen. When an icon is selected, the transmission conditions including the destination in correspondence to the icon are set automatically, and the data transmission is started. It is also possible to send image data obtained by setting and reading a document in a scanner (not shown) in the multi-functional peripheral. In this case, the image data to be transmitted is obtained by scanning after the one-touch key is selected.

It is known to register destination information to a one-touch key based on transmission history, but in this embodiment the transmission history is not used. The destination information is received after transmission of image data, and is registered to a one-touch key. In concrete, after the image data transmission, a receiving apparatus informs to a transmitting apparatus that the transmission data is received normally (completion of transmission) and returns the destination information to be used for transmission to the receiving apparatus. When the transmitting apparatus receives the destination information, it registers it to a one-touch key. The destination information includes an icon, and in a subsequent transmission, the icon returned form the receiving apparatus is displayed on the one-touch key. Therefore, it is not needed for the transmitting apparatus to create an icon (image) for the one-touch key for the transmission to the receiving apparatus.

Figure 3:
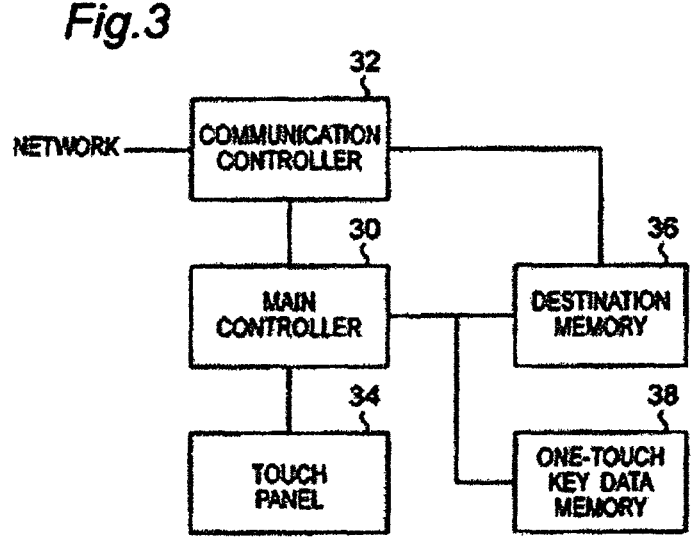
FIG. 3 is a block diagram of functions for transmitting data in a multi-functional peripheral as a transmitting apparatus.

FIG. 3 is a block diagram on functions related to data transmission in the multi-functional peripheral 12 as a transmitting apparatus. A main controller 30 which controls the entire apparatus is connected to a communication controller 32 for communication via the network 10, a touch panel 34 used as an operation device and as a display device, a destination memory device 36 and a one-touch key data memory device 38. The destination memory device 36 stores names of destinations, addresses thereof, transmission methods used for transmission to the destinations and the like. The one-touch key data memory device 38 stores data to be registered to one-touch keys, the data for each of the one-touch keys including a one-touch key number for identifying a one-touch key, image data of an icon for representing a destination registered to the one-touch key and various transmission conditions. The memory devices 36 and 38 are provided, for example, in a hard disk in the multi-functional peripheral 12.

Further, an interface (not shown) is also provided for receiving an image from the image input device 20.

Figure 4:
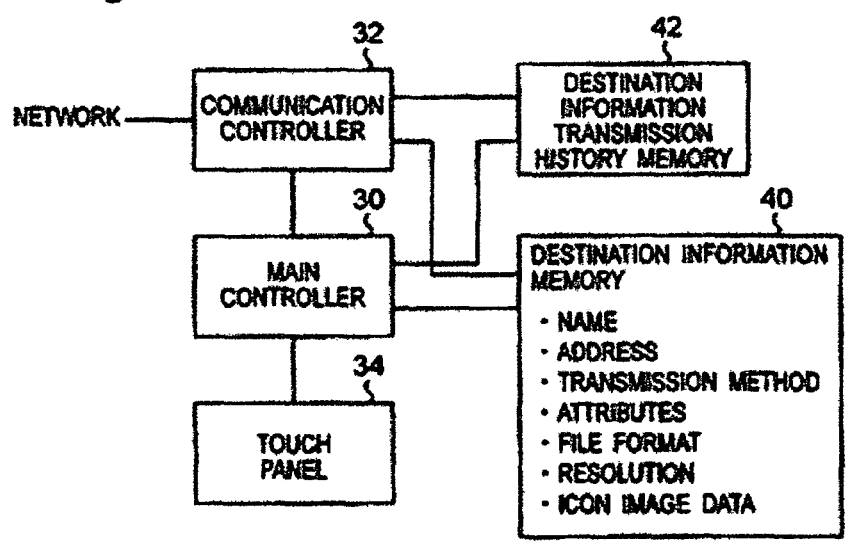
FIG. 4 is a block diagram of functions for receiving data in a multi-functional peripheral as a receiving apparatus.

FIG. 4 is a block diagram of functions for receiving data in a multi-functional peripheral 14, and functions similar to those shown in FIG. 3 are not explained here. A destination memory device 40 stores destination information including an icon image data and transmission conditions to be used in subsequent transmissions. A memory device 42 stores a transmission history of the destination information. The memory devices 40 and 42 are provided, for example, in the hard disk in the multi-functional peripheral 12. As is known for a person skilled in the art, the multi-functional peripherals 12,14 have an image reader, a printer, a facsimile apparatus and the like for scan, print, copy and facsimile communication functions, but explanation thereof is omitted here.

Figure 6:
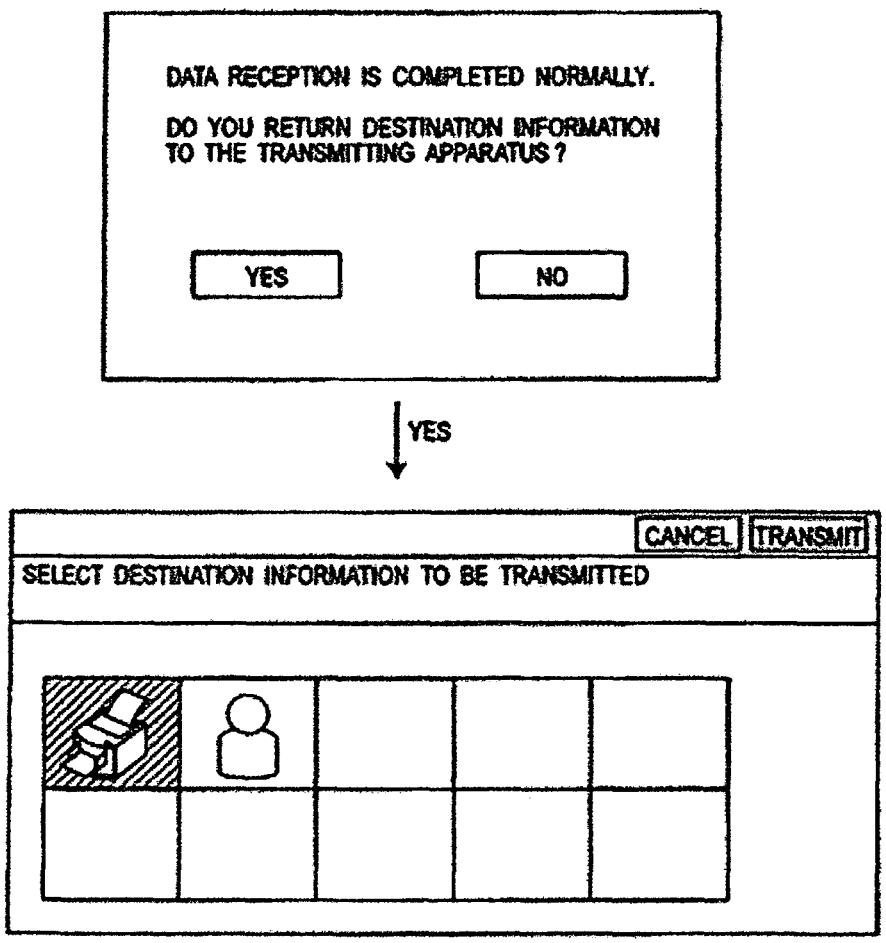
FIG. 6 is a diagram of screens for selecting destination information in one-touch keys.

It is assumed here that the multi-functional peripheral 12 is operated as a transmitting apparatus while the multi-functional peripheral 14 is operated as a receiving apparatus. In the multi-functional peripheral 12 as a transmitting apparatus, an operator sets destination information for an image data to be transmitted with the touch panel 34. When transmission is instructed with the touch panel 34, the communication controller 32 sends the image data via the network 10 to the receiving apparatus. When destination information including an icon is received with a message of completion of transmission from the receiving apparatus, the main controller 30 assigns the destination information to a one-touch key in the touch panel 34, and stores it in the one-touch key data memory device 38. In subsequent transmissions, the image data or icon for representing the receiving apparatus is displayed in the touch panel 34, as shown in FIG. 6. When the icon is selected, image data can be transmitted to the receiving apparatus with the destination information set by the receiving apparatus itself.

On the other hand, in the multi-functional peripheral 14 as a receiving apparatus, the communication controller 32 receives the above-mentioned image data via the network 10. When it is decided that the reception of image data is completed normally, the main controller 30 returns destination information including an icon besides a message of completion of transmission.

The destination information registered to a one-touch key includes transmission conditions such as a data format as well as a name of a destination, an address thereof, an icon for representing it, and a data transmission method. When an operator selects the icon, data is transmitted according to the transmission conditions specified by the receiving apparatus and included in the destination information in correspondence to the icon. This is explained here. When a transmitting apparatus sends data by setting transmission conditions, it cannot grasp the receiving state in the receiving apparatus. Therefore, the transmission conditions set by the transmitting apparatus may not be appropriate for the receiving apparatus. In this embodiment, priority of the transmission method and the transmission conditions is given to the request of the receiving apparatus. Therefore, destination information including the transmission conditions appropriate for the receiving apparatus can be set with priority. For example, it is set to transmit an image data in portable document format (PDF) in transmission conditions, but the processing of image data in the PDF format may be a burden for a receiving apparatus. Thus, it is desirable to reflect the state of the receiving apparatus in the registration of the transmission conditions. Then, in the above-mentioned case on PDF format, a different data format such as Tag Image File Format (TIFF) is included in the transmission conditions to be returned to the transmitting apparatus in the destination information.

Figure 5:
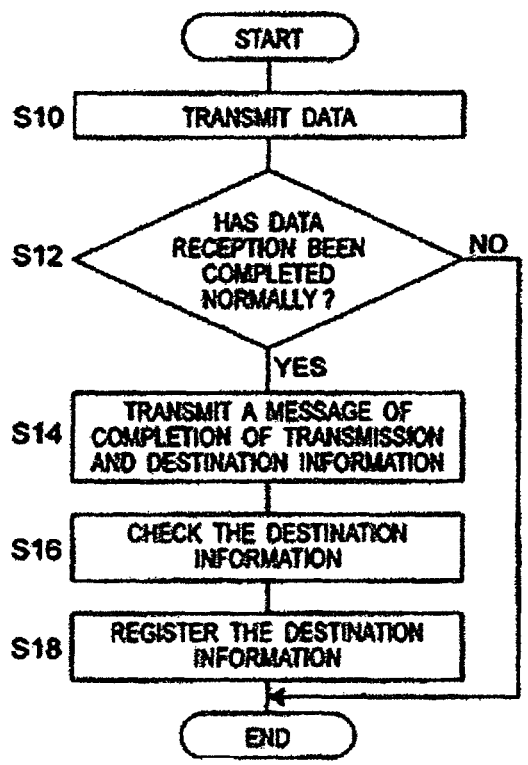
FIG. 5 is a flowchart of data transmission including registration of destination in the network system.

FIG. 5 is a flowchart of data transmission including registration of destination of the main controllers of a transmitting apparatus such as the multi-functional peripheral 12 and a receiving apparatus such as the multi-functional peripheral 14. The transmitting apparatus 12 transmits data via the network 10 to the receiving apparatus 14 (S10). The receiving apparatus 14 receives the data and decides whether the data is received normally or not (S12). When it is decided that the data is received normally, the receiving apparatus sends a message of completion of transmission and destination information read from the destination information memory 40 to the transmitting apparatus (S14). The destination information includes an icon representing the transmitting apparatus. Further, the transmission of the destination information is recorded as a history in the memory 42 for storing transmission histories of the destination information. Then the transmitting apparatus 12 checks the received destination information for registration (S16). It registers the destination information in the destination memory device 36 when the destination information is decided to be registered, otherwise the destination information is changed and registered (S18).

FIG. 6 shows a screen for selecting destination information in the multi-functional apparatus 14 as the transmitting apparatus. As shown at the upper side in FIG. 6, after the data is received normally, a dialog box is displayed in the touch panel 34 of the multi-functional apparatus 14 for selecting whether to return destination information or not. If "YES" key is selected for a question whether to return destination information to the transmitting apparatus or not, another screen for selecting a destination is displayed as shown in the lower side in FIG. 6. In this example, ten addresses can be registered, but two addresses are displayed with icons in the screen. When an operator selects one of the icons and presses "TRANSMIT" key, the multi-functional apparatus 14 returns the selected destination information to the multi-functional apparatus 12 as the transmitting apparatus besides the message of completion of transmission. Manual selection is explained here, but automatic selection is possible by specifying a default destination to be transmitted to the transmitting apparatus beforehand.

Figure 7:
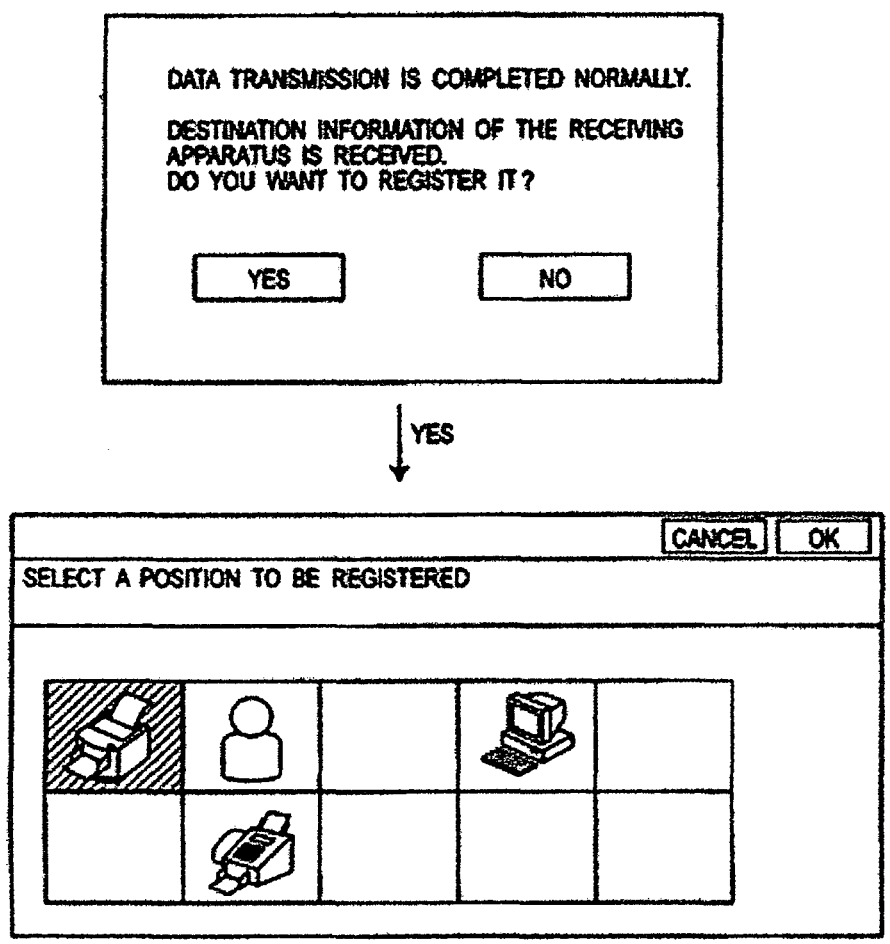
FIG. 7 is a diagram of screens for notifying completion of data transmission and for registering the destination information.
Figure 8:
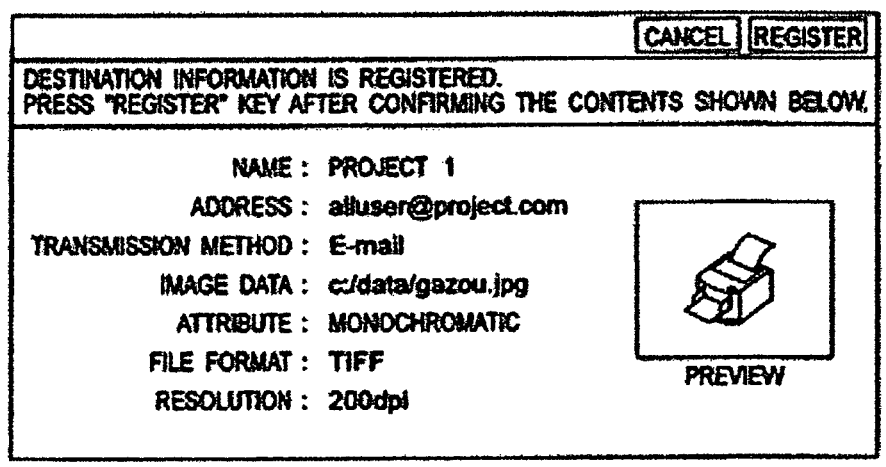
FIG. 8 is a diagram of a screen for displaying detailed data of the destination information.

FIG. 7 is a diagram for explaining registration of destination information at the multi-functional peripheral 12 as a transmitting apparatus. When a message of completion of transmission and destination information are received from a receiving apparatus, a dialog box is displayed in a screen for notifying completion of data transmission and for registering the destination information to an operator, as shown at the upper side in FIG. 7. In the dialog box, it is selected whether to register the destination information or not. When an operator selects "YES" key for a question whether to register the data or not, one-touch keys are displayed in a screen, as shown at the lower side in FIG. 7. Up to ten one-touch keys can be registered in the screen. When the operator selects a position to be registered, another screen shown in FIG. 8 is displayed, wherein the received destination information including a preview image of the icon is displayed. When the operator confirms the contents of the destination information and presses "REGISTER" key, the destination information is registered to the one-touch key at the selected position, and the icon included in the destination information is displayed at the position. The operator can edit the received information. It is also possible to register the destination information automatically to a one-touch key specified preliminarily.

Figure 9:
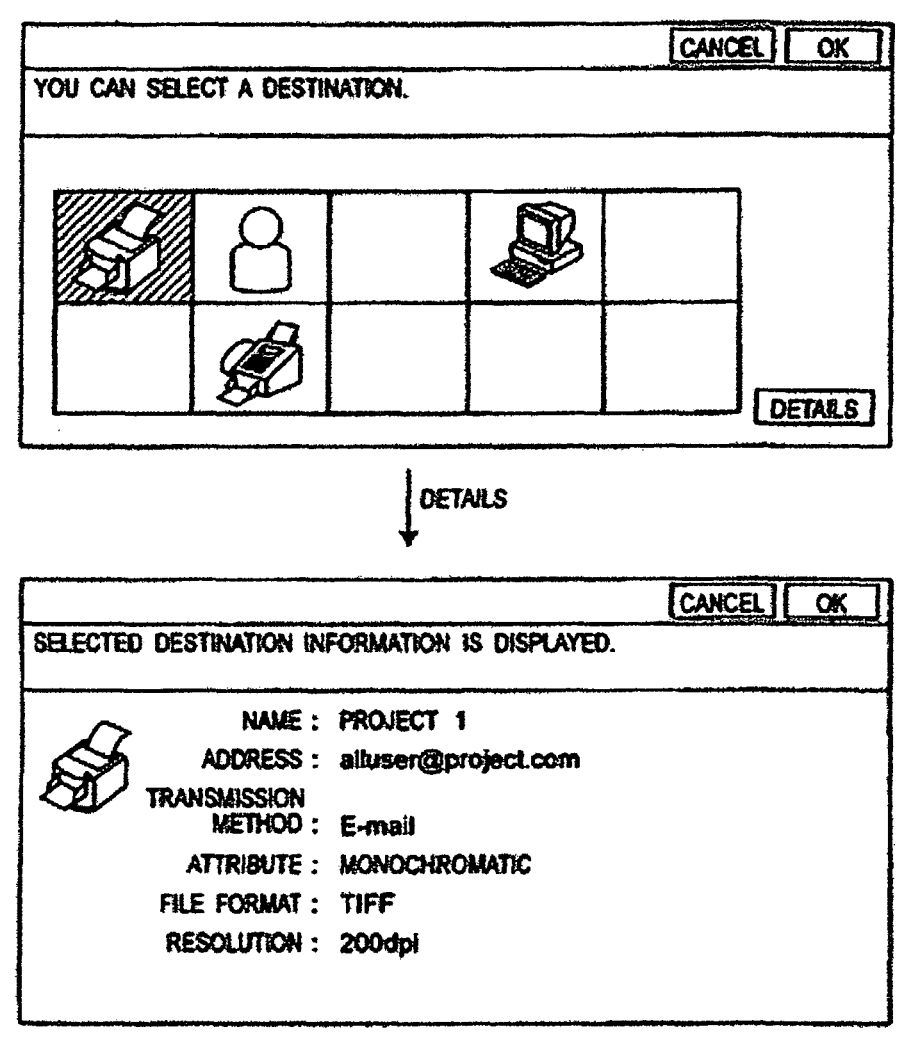

FIG. 9 shows at the upper side a screen for selecting a one-touch key in the touch panel 34 in the multi-functional peripheral 12 as the transmitting apparatus wherein an operator selects a destination for data transmission. In the screen, ten one-touch keys can be registered, and the destinations registered at four one-touch keys are shown with icons. When one of the icons is selected for data transmission and "OK" key is pressed, the destination registered to the one-touch key in correspondence to the selected icon is set. When "DETAILS" key is selected after specifying an icon, the destination information registered to the icon is shown in detail in a screen as shown at the lower side in FIG. 9. In the screen, transmission conditions such as transmission method, color attribute of a file to be attached, file format and resolution are displayed besides the name and address of a destination. In the example shown in the screen, an operator recognizes the name of destination, finds the file to be transmitted with an electronic mail, and recognizes electronic mail address and conditions of image data.

Figure 10:
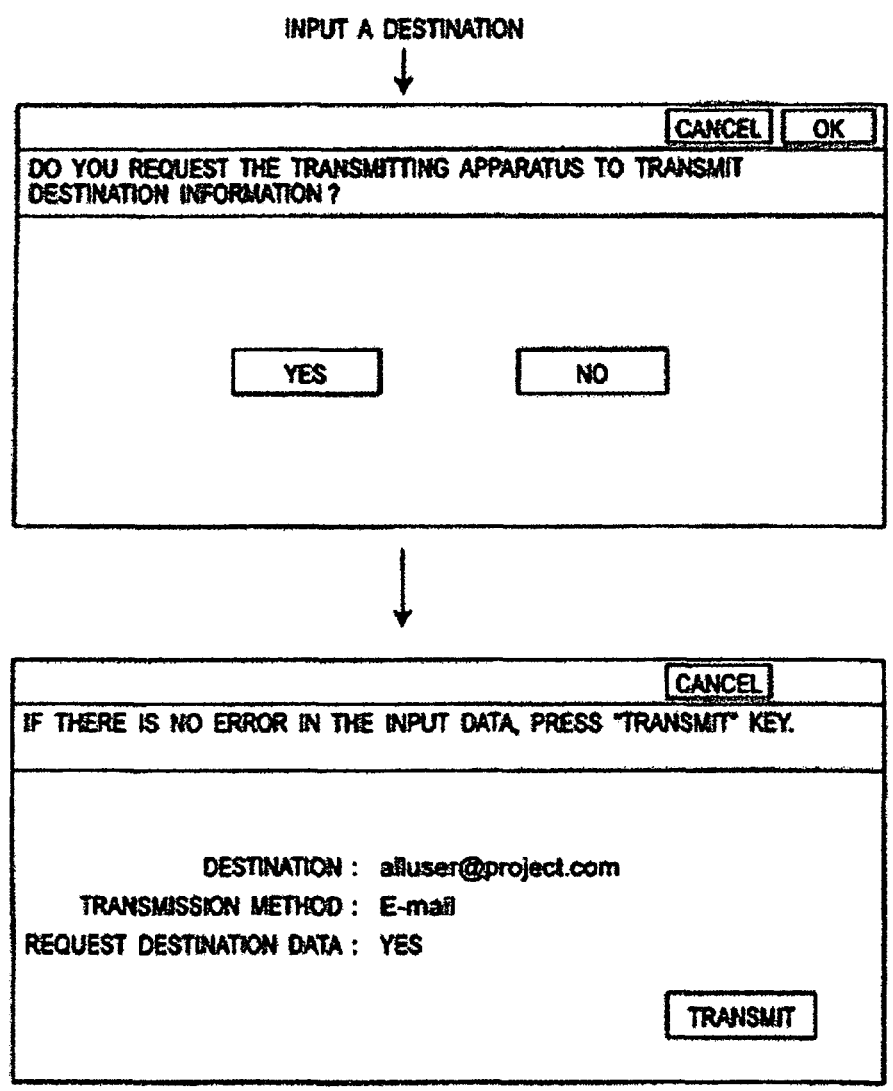
FIG. 10 is a diagram of screens for selection whether to request transmission of destination information or not.

In a modified embodiment, when destination information is inputted directly on data transmission, it is requested to return the address information to the receiving apparatus. As shown in FIG. 10, when an operator inputs destination information, a dialog box is shown in the touch panel 34 for selecting whether to request to return destination information from the receiving apparatus or not. When the operator selects "YES" key, a screen for data transmission is displayed. If the operator confirms the input data shown in the screen, he or she presses "TRANSMIT" key. Then, the request to return the address information is transmitted besides the image data. If the request is not received, the receiving apparatus does not return the destination information.

Figure 11:
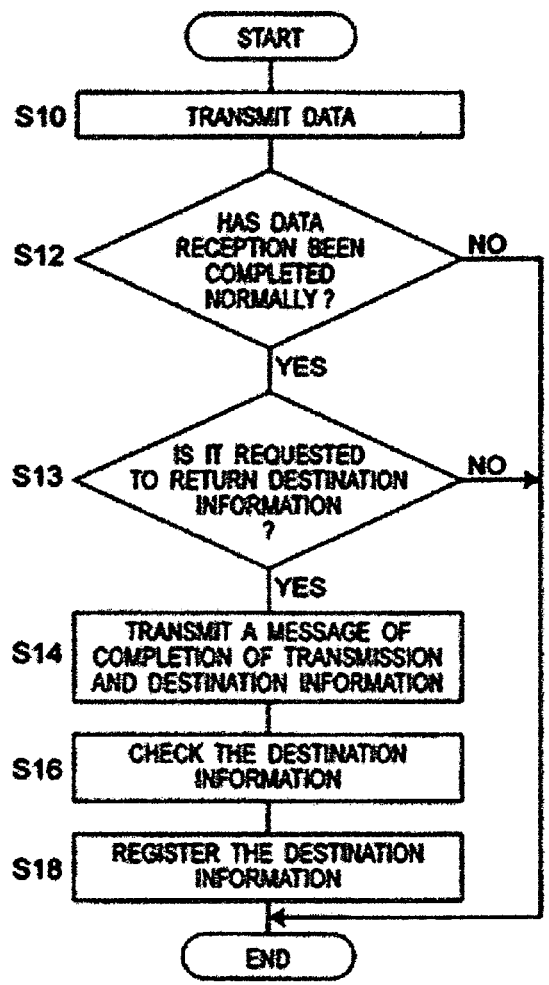
FIG. 11 is a flowchart for sending and registering destination information when a request to send destination information is received.

FIG. 11 is a flowchart to be executed by the main controllers in the transmitting apparatus such as the multi-functional peripheral 12 and in the receiving apparatus such as the multi-functional peripheral 14, for sending and registering destination information when a requested to send destination information is received. At the transmitting apparatus 12, operator's input of destination information of the receiving apparatus is received, and the image data is sent to the receiving apparatus 14 (S10). At the receiving apparatus 14, it is decided whether the image data is received normally or not (S12). When it is decided that the image data is received normally (YES at S12), and when a request to return destination information is received from the transmitting apparatus (YES at S13), the receiving apparatus sends a message of completion of transmission and destination information including an icon of the transmitting apparatus read from the destination information memory 40, to the transmitting apparatus (S14). At the transmitting apparatus 12, if it is decided that the destination information received should be registered (YES at S16), the destination information is registered in the destination memory device 36 (S18). An operator can edit the received destination information on registration if it is decided that the destination information is not appropriate.

Figure 12:
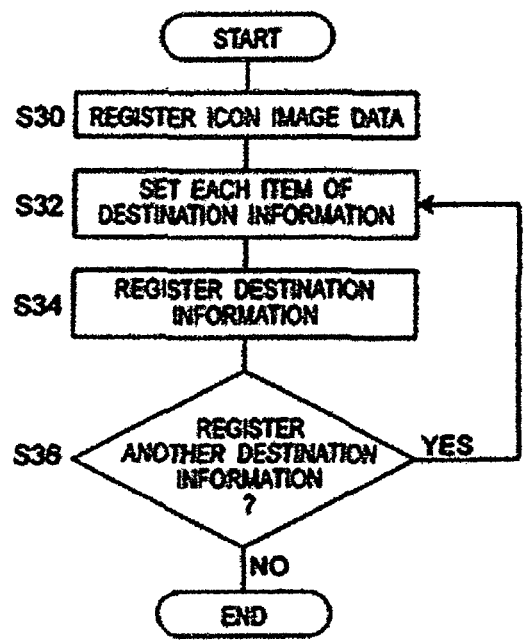
FIG. 12 is a flowchart of registration of image data.
Figure 13:
FIG. 13 is a diagram of a screen for registering destination information.

At the multi-functional peripheral 14 as the receiving apparatus, destination information is registered beforehand in the destination information memory device 40. FIG. 12 is a flowchart of registration of destination information in the destination information memory device 40. The registration is performed for each image data. First, an image data of an icon is registered (S30). Next, each setting item in the destination information is set (S32). Then, the destination information is registered in the destination information memory device 40 (S34). FIG. 13 shows a screen for registering destination information. An operator inputs necessary items in the screen, and presses "REGISTER" key in order to register the destination information. It is also possible to select destination information registered already and to register the as-selected destination information. Next, if it is necessary to register other destination information, the flow returns to step S32 for further registration.

Figure 14:
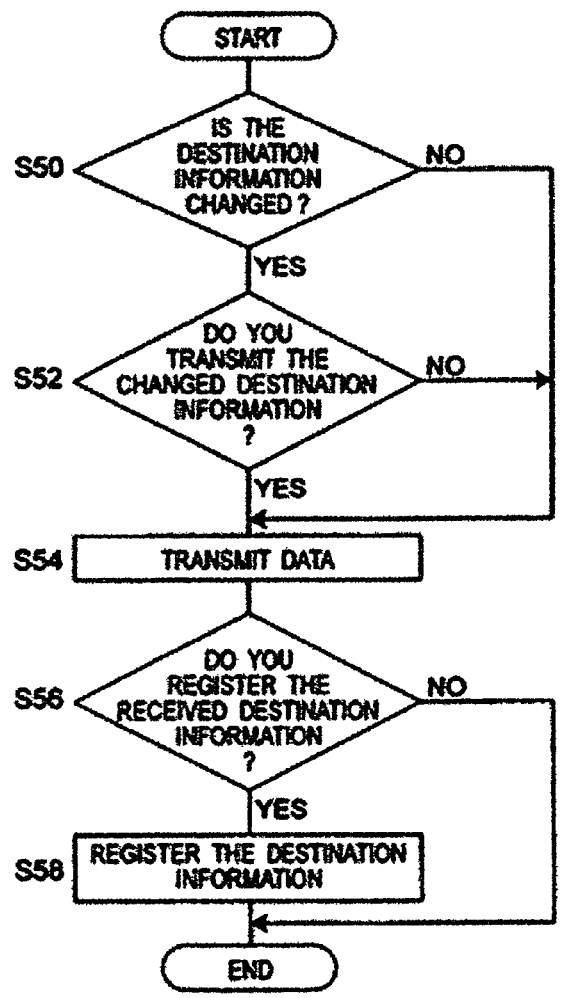
FIG. 14 is a flowchart when destination information in a transmitting apparatus is changed.

FIG. 14 is a flowchart when destination information of a receiving apparatus is changed or edited in the transmitting apparatus. When the destination information of the receiving apparatus is changed, it is updated. In the receiving apparatus, it is decided first whether the destination information is changed or not (S50). When it is decided that the destination information is changed, it is decided next whether to transmit the changed address information or not (S52). In concrete, by referring to the transmission information transmission history memory device 42, it is decided whether or not a history is found that destination was transmitted beside the message of completion of transmission. When such a history is found, the changed destination information is sent to the transmitting apparatus (S54). At the transmitting apparatus, it is decided to replace the destination information stored in the destination memory device 36 and the one-touch key memory device 38 with the transmitted destination information (S56), and if the transmitted contents is found different from the stored data, the address information is updated (S58).

Figure 15:
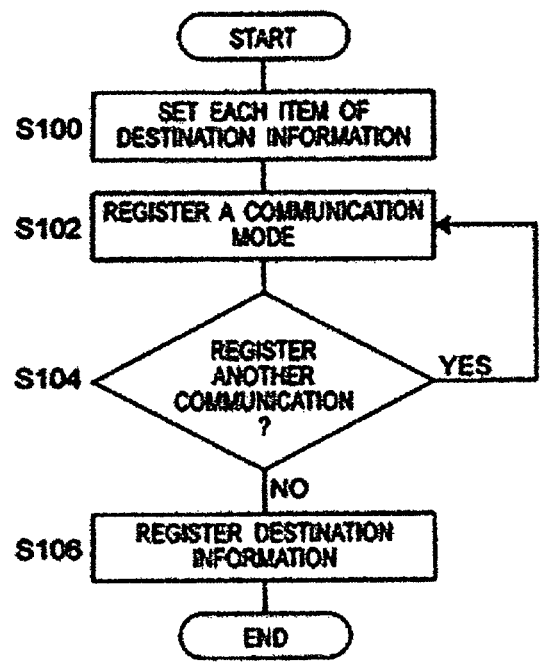
FIG. 15 is a flowchart for registering a communication mode.

FIG. 15 is a flowchart for registering a communication mode in a receiving apparatus. A plurality of transmission modes such as a transmission route can be registered in a one-touch key. Then, the communication mode can be changed according to the type of line. The communication mode can be set, for example, at the initialization of the apparatus. First, an operator sets each item such as image data and destination name, for image data communication (S100), the communication mode is registered (S102). Next, it is decided to register a next communication mode or not (S104). In an environment wherein transmission in a different mode is possible, the flow returns to step S102 for setting other mode (s). After setting one or more modes as mentioned above, the destination information is registered (S106). Thus, one or more communication modes can be set to a one-touch key.

Figure 16:
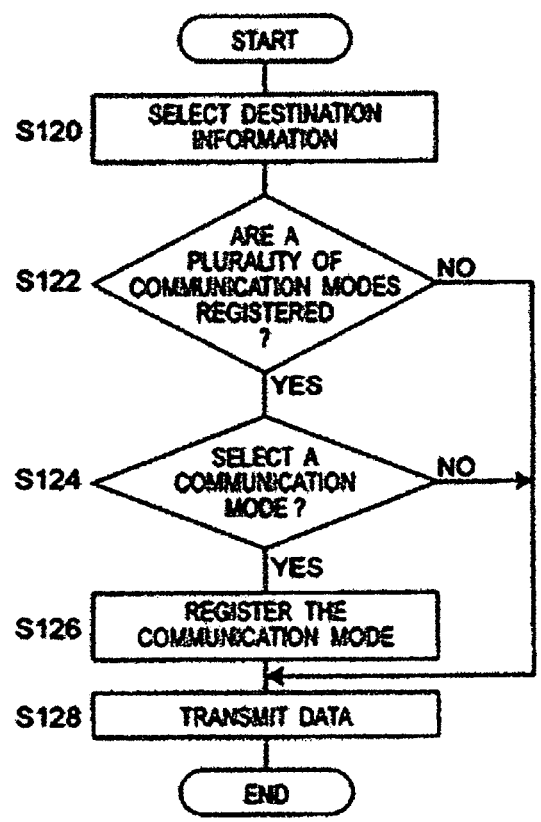
FIG. 16 is a flowchart for selecting a communication mode on transmission.

It is possible to register a plurality of destination information to a one-touch key so that transmission is performed simultaneously to the plurality of destinations. FIG. 16 is a flowchart for selecting a communication mode on transmission. First, an operator selects destination information (S120). When a plurality of communication modes are registered to the selected destination information (YES at S122), and when one of them is selected (S124), the selected communication mode is registered (S126), and the flow proceeds to step S128. When only one communication mode is registered, or when all the communication modes are selected, the flow proceeds to step S128 readily. Then, data is transmitted in the selected communication mode(s) (S128).

Figure 17:
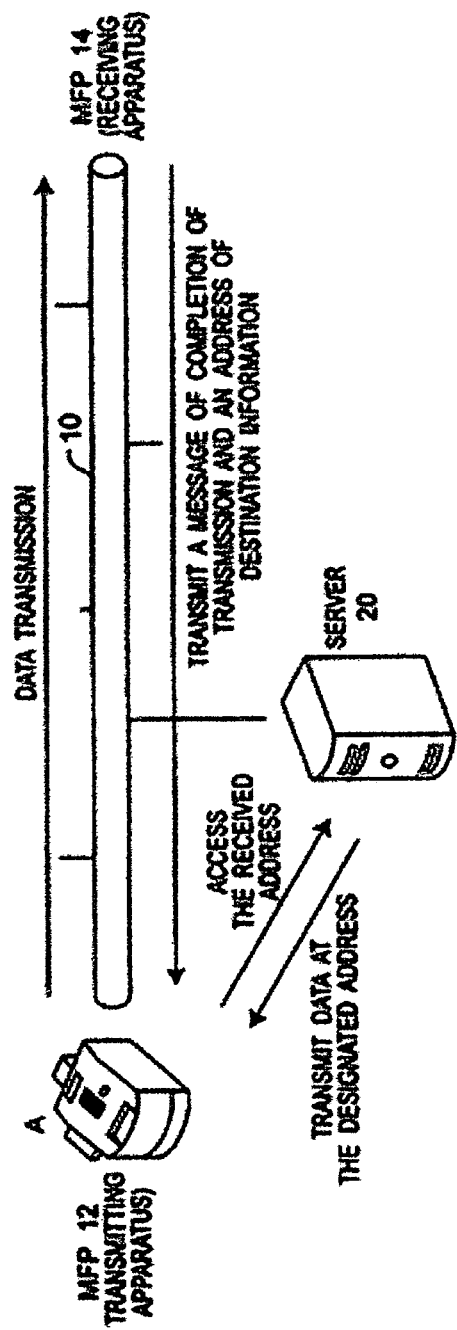
FIG. 17 is a diagram for explaining data transmission in a system including a transmitting apparatus, a receiving apparatus and a server apparatus.

In a second embodiment, destination information as well as an image is registered in an image data server apparatus 20. As shown in FIG. 17, a multi-functional apparatus 12 as a transmitting apparatus receives destination information inputted by an operator and transmits an image data (or an icon image data) of the destination information via the network 10 to a different apparatus such as another multi-functional apparatus 14. The latter multi-functional apparatus 14 receives the image data. Then, it transmits a message of completion of transmission and an address as information on the site where the destination information is stored. When the former multi-functional apparatus 12 receives the return transmission, it accesses the notified address in an image database provided in the image data server apparatus 20. Then, the former multi-functional apparatus 12 acquires the destination information of the latter multi-functional apparatus 14 from the image data server apparatus 20. For example, a general file server apparatus is used as the image data server apparatus 20.

Figure 18:
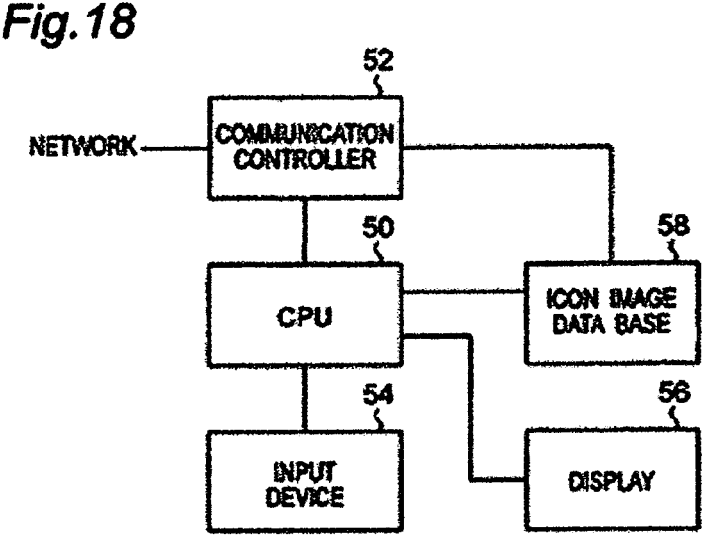
FIG. 18 is a block diagram of an image data server apparatus.

FIG. 18 is a block diagram of an image data server apparatus. A central processing unit 50 for controlling the entire apparatus is connected to a communication controller 52 for communication via the network 10, an input device 54 such as a keyboard, a display device 56, and a storage device 58 for storing an icon image database. The destination information received from the transmitting apparatus is also stored in the icon image database. The registration of destination information is similar to that shown in FIG. 6.

Figure 19:
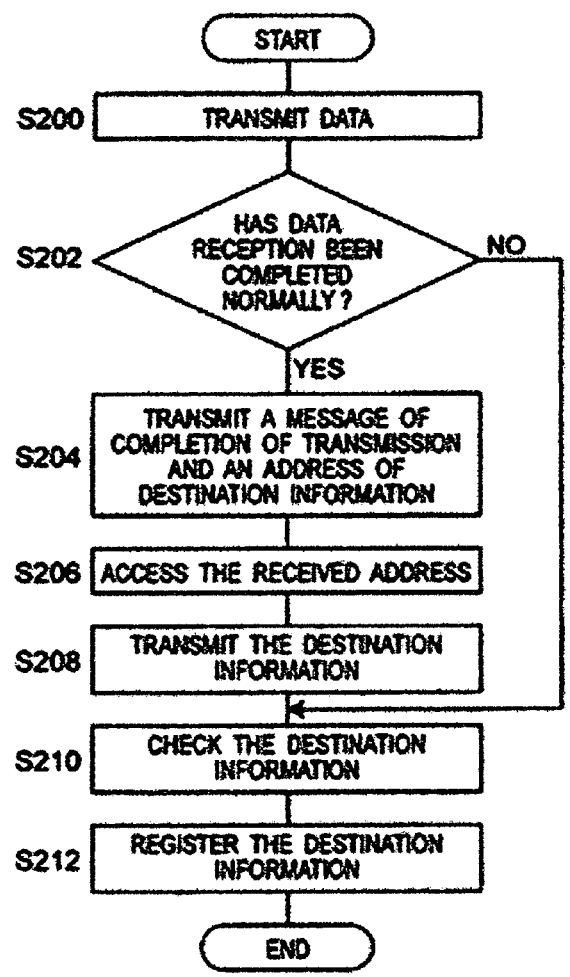
FIG. 19 is a flowchart of data transmission including address registration.

FIG. 19 is a flowchart of data transmission (including address registration) between a transmitting apparatus such as the multi-functional peripheral 12, a receiving apparatus such as the multi-functional peripheral 14, both having the main controller, and the image data server apparatus 20 having the CPU. The transmitting apparatus transmits data via the network to a receiving apparatus (S200). The receiving apparatus receives the data and decides whether the data is received normally or not (S202). When it decides that the data is received normally, it transmits a message of completion of transmission and an address of a site storing the destination information of the receiving apparatus (S204). When the transmitting apparatus accesses the notified address (or the image data server apparatus 20) (S206), the image data server apparatus 20 transmits the destination information of the receiving apparatus (S208). When the transmitting apparatus decides that the registration of the received destination information is appropriate, the received destination information is registered (S212). On the other hand, when the received destination information is decided inappropriate, it is changed and registered.

In the above-mentioned image data server apparatus, destination information is stored with an icon image data. Alternatively, the destination information is stored separately from the icon image data, and an address of a site for storing the destination information is returned. The transmitting apparatus accesses the address to acquire the destination information.

In the above-mentioned embodiments, registration of destination information to a one-touch key is explained. As will be understood by person skilled in the art, registration of address information to an abbreviated dial or the like can be performed similarly.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data transmission system comprising at least one transmitting apparatus and one receiving apparatus, wherein the transmitting apparatus is connected via a network to the receiving apparatus and transmits image data to the receiving apparatus, wherein said transmitting apparatus comprises:

a first communication device which transmits the image data via the network to the receiving apparatus indicated by destination information; and an operation device including operating keys for instructing said first communication device to transmit the image data, wherein destination information indicating at least one receiving apparatus is registered to one of the operating keys;

wherein said receiving apparatus comprises:

a storage device which stores information on the receiving apparatus corresponding to the destination information of the receiving apparatus, the corresponding information of the destination information of the receiving apparatus or information indicated by the corresponding information of the destination information of the receiving apparatus being registered to one of the operating keys in said operation device and including destination image data to be displayed on the one of the operating keys of the operation device; and a second communication device which returns the corresponding information of the destination information of the receiving apparatus stored in said storage device to said transmitting apparatus in response to receiving the image data from said transmitting apparatus; and wherein said transmitting apparatus further comprises a register device which registers the corresponding information of the destination information of the receiving apparatus or the information indicated by the corresponding information of the destination information of the receiving apparatus to said one of the operating keys in said operation device in response to receiving the corresponding information of the destination information of the receiving apparatus from the receiving apparatus or from a site indicated by the corresponding information of the destination information of the receiving apparatus.

2. The data transmission system according to claim 1, wherein when said second communication device receives the image data normally, it returns a message of completion of transmission and the corresponding information of the destination information of the receiving apparatus to the transmitting apparatus.

3. A receiving apparatus connectable to a data transmission system wherein a transmitting apparatus which transmits image data is connected via a network to the receiving apparatus which receives the image data, the transmitting apparatus comprising an operation device for operating keys for instructing data transmission to the receiving apparatus, wherein destination information of the receiving apparatus can be registered to one of the operating keys, the receiving apparatus comprising:

a storage device which stores destination information of the receiving apparatus or site information on a site on the receiving apparatus which stores the destination information of the receiving apparatus, the destination information of the receiving apparatus being registered to one of the operating keys in the transmitting apparatus, the destination information of the receiving apparatus including destination image data to be displayed on the one of the operating keys; and a communication device which returns the destination information of the receiving apparatus or site information stored in said storage device to the transmitting apparatus in response to receiving the image data from the transmitting apparatus.

4. The receiving apparatus according to claim 3, wherein when said communication device receives the image data normally, it returns a message of completion of transmission and the destination information or the site information to the transmitting apparatus.

5. The receiving apparatus according to claim 3, wherein the destination information comprises a name representing the destination.

6. The receiving apparatus according to claim 3, wherein the destination information comprises transmission conditions.

7. The receiving apparatus according to claim 3, wherein the destination information comprises data format.

8. The receiving apparatus according to claim 3, wherein when the destination information or the site information is changed, said communication device returns the changed destination information or site information to the transmitting apparatus.

9. The receiving apparatus according to claim 3, further comprising an input device for inputting the information on the destination or on a storage site of the information to said storage device.

10. The receiving apparatus according to claim 3, wherein said storage device stores the destination information or information on a site which stores the destination information.

11. The receiving apparatus according to claim 3, wherein said communication device returns the destination information or site information when it receives a request to return the destination information.

12. A transmitting apparatus connectable to a data transmission system wherein the transmitting apparatus which transmits image data is connected via a network to a receiving apparatus which receives the image data, comprising:

an operation device for operating keys for instructing data transmission to the receiving apparatus indicated by destination information, wherein destination information of said receiving apparatus is registered to one of the operating keys; and a register device which registers the destination information on the receiving apparatus and information corresponding to the destination information of the receiving apparatus to the one of the operating keys in said operation device, the destination information includes destination image data to be displayed on the one of the operating keys in response to receiving the destination information and the corresponding information of the destination information of the receiving apparatus from the receiving apparatus;

an acquisition device which acquires additional information related to the destination information by accessing a site based on the corresponding information of the destination information of the receiving apparatus that includes site information.

13. The transmitting apparatus according to claim 12, wherein said register device registers the destination information and the corresponding information according to user's instruction of registration.

14. The transmitting apparatus according to claim 12, further comprising a selector which selects whether to register the destination information or not, wherein said register device registers the selected destination information and information corresponding to the selected destination information of the receiving apparatus.

15. The transmitting apparatus according to claim 12, wherein said operating device displays the destination image data included in the corresponding information of the destination information of the receiving apparatus received by said receive device to the one of the operating keys.

16. The data transmission system according to claim 1, wherein the destination image data to be displayed on the one of the operating keys includes image data of an icon.

17. The receiving apparatus according to claim 3, wherein the destination image data to be displayed on the one of the operating keys includes image data of an icon.

18. The transmitting apparatus according to claim 12, wherein the destination image data to be displayed on the one of the operating keys includes image data of an icon.

\* \* \* \* \*